(No Model.)

C. C. RICH.
ELECTRIC HEATER.

No. 447,353. Patented Mar. 3, 1891.

Witnesses
Percy C. Bowen
David P. Wolhaupter

Inventor
Charles C. Rich,
By his Attorneys,
C. A. Snow & Co.

UNITED STATES PATENT OFFICE.

CHARLES CLAYTON RICH, OF MOUNT VERNON, NEW YORK.

ELECTRIC HEATER.

SPECIFICATION forming part of Letters Patent No. 447,353, dated March 3, 1891.

Application filed September 15, 1890. Serial No. 365,049. (No model.)

*To all whom it may concern:*

Be it known that I, CHARLES CLAYTON RICH, a citizen of the United States, residing at Mount Vernon, in the county of Westchester and State of New York, have invented a new and useful Electric Heater, of which the following is a specification.

My invention relates to improvements in apparatus for utilizing electrical energy for heating purposes; and it consists of a heat-absorbing core provided with washers of an absorbing and radiating nature and coils of insulated wire wrapped about said core or center between the washers, thus absorbing the heat from the inner part of the coils and bringing it to the surface for radiation.

It also consists of further details herein described, illustrated in the accompanying drawings, and particularly pointed out in the claims.

Figure 1:
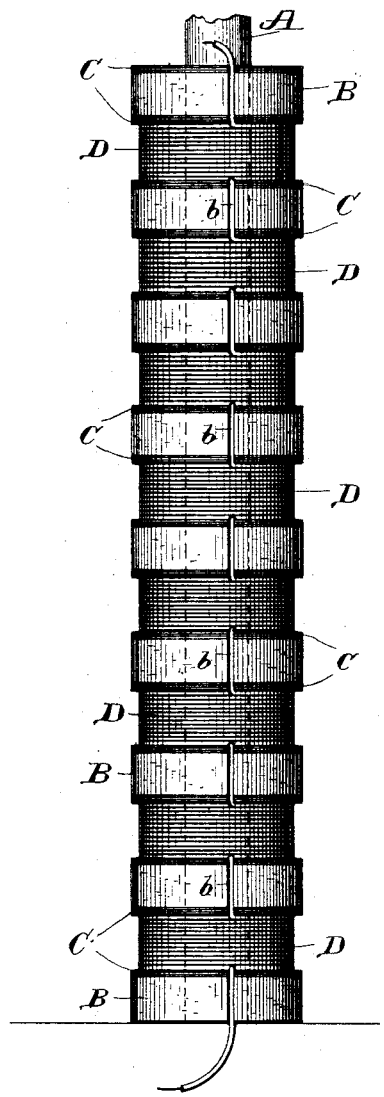
Figure 2:
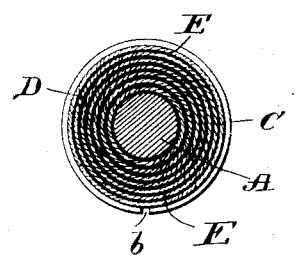
Figure 3:
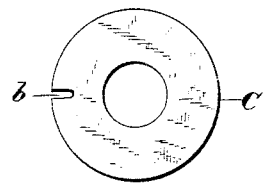

In the accompanying drawings, Figure 1 is a side elevation of my electrical heater. Fig. 2 is a transverse section. Fig. 3 is a detail of the washers.

Referring to the drawings, A indicates a metallic core, for which may also be substituted any other heat-absorbing body, such as earthenware, china, &c., and around the core is placed a series of rings B of the same material as the core, and also asbestos washers C, which are placed on each side of rings B, but may be of different substance from yet of the same nature as asbestos. Between the spaces of said rings and washers a coil of insulated wire D is tightly wrapped around the center A, being connected in a continuous circuit by passing through the slots *b* in the rings B. Also between each layer of each section of coils I insert a piece of insulating material E, such as mica and the like, which gives additional durability and efficiency to the described heater.

Where iron is used (which I prefer) in the heater herein described, an alternating current is used, as the changing of the polarity of the core generates additional heat, which, together with the induced heat from the coils of wire wrapped thereon, gives a heater of greater capacity than otherwise. It can be readily seen that when the temperature of the wire is raised the collars encircling the core will commence to absorb the heat and continue until they have reached the same temperature as the core and coils, and will radiate their heat more intensely as they may be allowed to come in contact with the object which they are to heat—as in a boiler-flue, for example. By the arrangement of the coils, core, and washers the current is found to have more surface to radiate on and encounters less resistance than in other modes, and therefore possesses peculiar advantages thereover.

This device may be used in any manner in which it may be applied for heating purposes, as its form may be altered to suit the object to which it is applied without changing the principles applied or the relations of the elements to each other.

Having described my invention, what I claim, and desire to secure by Letters Patent, is—

1. An electric heater consisting of a heat-absorbing core, a series of radiating-rings encircling said core, said rings being provided on both sides with insulating-washers, and insulated coils surrounding said core between the rings and washers, substantially as described.

2. An electric heater consisting of a heat-absorbing center, a series of radiating-rings encircling said core, said rings being provided with slots and with insulating-washers on both sides, and insulated coils surrounding said core between the rings and washers, being connected into a continuous circuit by passing through the slots in said rings, which divide the coils, substantially as described.

3. An electric heater consisting of a heat-absorbing center, a series of radiating-rings encircling said core, said rings being provided with slots and with insulating-washers on both sides, and insulated coils surrounding said core between the rings and washers, being connected into a continuous circuit by passing through the slots in said rings, which divide the coils, and an insulating substance placed between each layer of each section of coils, substantially as described.

4. An electric heater consisting of an iron core, a series of iron radiating-rings provided on both sides with asbestos washers and with slots, and insulated coils surrounding the core between the rings and washers, being connected into continuous circuit by passing through the slots in said rings, which divide the coils, substantially as described.

5. An electric heater consisting of an iron core, a series of iron radiating-rings provided on both sides with asbestus washers and with slots, insulated coils surrounding the core between the rings and washers, being connected into continuous circuit by passing through the slots in said rings, which divide the coils, and an insulating substance placed between each layer of each section of coils, substantially as described.

In testimony that I claim the foregoing as my own I have hereto affixed my signature in presence of two witnesses.

CHARLES CLAYTON RICH.

Witnesses:
WM. M. BUNCHELLE,
WM. H. HORSFALL.